M. B. Champion.
Rotary Harrow.

No. 92,422.  Patented July 13, 1869

Witnesses.
Jno. D. Patten
Edmund Masson

Inventor.
Myron B. Champion
By atty A. B. Stoughton.

United States Patent Office.

MYRON B. CHAMPION, OF STURGIS, MICHIGAN.

Letters Patent No. 92,422, dated July 13, 1869.

---

IMPROVEMENT IN ROTARY HARROWS.

---

The Schedule referred to in these Letters Patent and making part of the same.

---

*To all whom it may concern:*

Be it known that I, MYRON B. CHAMPION, of Sturgis, in the county of St. Joseph, in the State of Michigan, have invented a new and useful Improvement in Rotary Drags; and I do hereby declare that the following is a full and exact description thereof, reference being had to the accompanying drawings, and to the letters of reference marked thereon.

Similar letters of reference, where they occur in the separate figures, denote like parts of the machine in both of the drawings.

Figure 1:
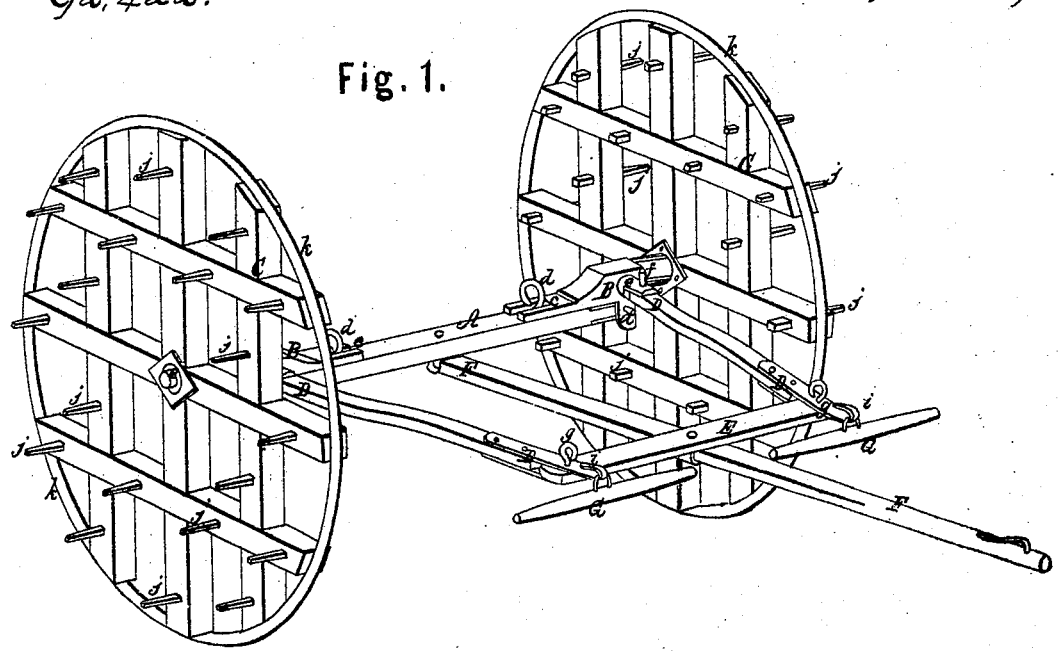
Figure 1 represents, in perspective, the harrow and its several connected parts, in the positions they occupy when converted into a truck to carry itself to and from the field.
Figure 2:
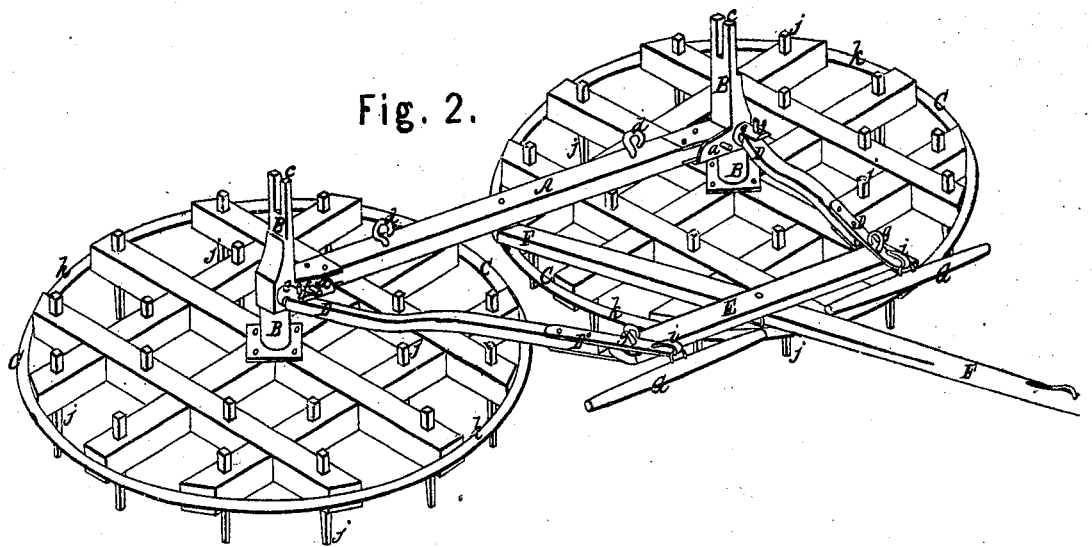
Figure 2 represents the same parts, in the positions they occupy when it is a rotary harrow, and ready to be worked in the field.

I am aware that several forms of rotary harrows, that are convertible into a truck to transport themselves to and from the field, have been made, used, and patented. But in their construction they have been so made, that the drag-bars either did not connect with the hinged journals, on which the rotary harrows are hung, and thus leave all the strain upon the hinged or pivoted connections, or the drag-bars, if connected to said hinged journals, either were so loose as to give very little support to those parts, or else, when the wheels were turned down upon the ground to form harrows, such drag-bars were twisted, or bent, clear out of place, making the drag or draught unreliable. To such harrow-connections, I lay no claim.

My invention consists in connecting the hounds or rigid bars, by which the drag and resistance of the machine is taken, to a swivelling-pin in the journal-head, on which the harrow-wheels are placed and carried, so that as said journals, journal-heads, and wheels are turned down to form harrows, or up to form truck-wheels, the hounds or drag-bars maintain a uniform position, while the swivels turn and admit of such changes, and still leave the draught or drag-connections comparatively rigid and strong.

To enable others skilled in the art to make and use my invention, I will proceed to describe the same with reference to the drawings.

A represents a cross-bar or axle, to which are hinged at *a a*, journal-heads B B, to or on suitable journals, on which are placed the harrow-wheels C C, so that on being drawn over the ground, they will turn on said journals.

Beside the hinge *a*, and the journals on these heads B, there is a slot or fork, *c*, that takes over a turning-pin, *d*, in the axle, to hold them when swung down over said pin.

To the heads B are connected swivel-pins, *e*, to which pins the hounds or drag-bars D D are pivoted, as at *f*, so as to move laterally on said pivots, but not vertically to any extent.

The forward ends of the hounds or drag-bars D, after being pivoted at *g* to the cross-bar E, which is connected to the tongue F, terminate in hooks *i*, or other devices used for the purpose, to which the single-trees G are fastened, and to which the team is hitched, and by which the harrows are drawn.

The drag or harrow-wheels C are furnished with a series of teeth, *j*, and have tires, *k*, of a simple and cheap kind, put around them to prevent wear, when used as carrying-wheels.

The resistance, or "drag," as it is termed, of rotating harrows, as they are drawn over the field, is very great, and unless the drag-bars are connected to the journal-heads direct so as to draw upon them, and not simply carry them along by the hinged joint alone, they will not stand the resistance or strain. Nor will simple rods or links connected to the journal-heads serve the purpose, as, in changing the wheels from a vertical to a horizontal position, the heads must change from a horizontal to a vertical position, and such links or rods must be loose enough to admit of this change, and when loose enough for this swinging motion, then there is too much play to take the resistance of the harrows.

It will be perceived, by my construction, that in changing the machine from a truck to a harrow, or *vice versa*, the rear ends of the hounds D swing round a circle, of which *a* is the centre, but do not twist or turn over, whilst their front ends have no perceptible movement. They are always then in the direct line of draught between the team and the resistance, and have no shackle-motion, as links, chains, or rods would have, all of which must be taken up before the draught comes upon the journal-head, or is taken from the hinge-joint, which cannot, from its construction, resist so much strain.

Having thus fully described my invention,

What I claim therein as new, and desire to secure by Letters Patent, is—

In a harrow that is convertible from a truck to a harrow, and *vice versa*, the combination of the hinged journal-heads B, carrying the harrow-wheels, the swivel-pins *e*, and the drag-bars D, so that in either of its conditions, of truck or harrow, the drag-bars will maintain a uniform position in the line of draught or resistance, as described and represented.

MYRON B. CHAMPION.

Witnesses:
ISAAC D. TOLL,
S. E. LESTER.